(12) United States Patent
Auernhammer et al.

(10) Patent No.: US 9,158,692 B2
(45) Date of Patent: Oct. 13, 2015

(54) CACHE INJECTION DIRECTING TECHNIQUE

(75) Inventors: Florian A. Auernhammer, Rueschlikon (CH); Patricia M. Sagmeister, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 1109 days.

(21) Appl. No.: 12/499,249

(22) Filed: Jul. 8, 2009

(65) Prior Publication Data

US 2010/0042787 A1 Feb. 18, 2010

(30) Foreign Application Priority Data

Aug. 12, 2008 (CH) .................... 08105023

(51) Int. Cl.
*G06F 12/08* (2006.01)
(52) U.S. Cl.
CPC .................... *G06F 12/0831* (2013.01)
(58) Field of Classification Search
USPC ........................................... 711/146
See application file for complete search history.

(56) References Cited

U.S. PATENT DOCUMENTS

| | | | | |
|---|---|---|---|---|
| 7,865,668 | B2* | 1/2011 | Gregg et al. | 711/137 |
| 2004/0015969 | A1* | 1/2004 | Chang | 718/100 |
| 2007/0079074 | A1* | 4/2007 | Collier et al. | 711/141 |
| 2007/0113038 | A1* | 5/2007 | Hobson et al. | 711/168 |
| 2008/0183972 | A1* | 7/2008 | Dieffenderfer | 711/146 |

* cited by examiner

*Primary Examiner* — Kaushikkumar Patel
(74) *Attorney, Agent, or Firm* — Nelson and Nelson; Daniel P. Nelson; Alexis V. Nelson

(57) ABSTRACT

A method for directing cache injection based on actual system load may include providing a snooping-based fabric having two or more bus-coupled units. At least one of the bus-coupled units may be configured as an injection unit for directing cache injection. A snoop request may be transmitted from the injection unit to one or more destination units of the other bus-coupled unit. The snoop request may include an identification value having a function identifier. The function identifier may identify a destination function for the cache injection, where the destination function is configured to run on the destination unit. A snoop response may be transmitted from the destination unit to the injection unit in response to the snoop request. The snoop response may include a function response value indicating whether the function identifier matches a function indication of a snoop register for the destination unit.

20 Claims, 9 Drawing Sheets

Fig. 5
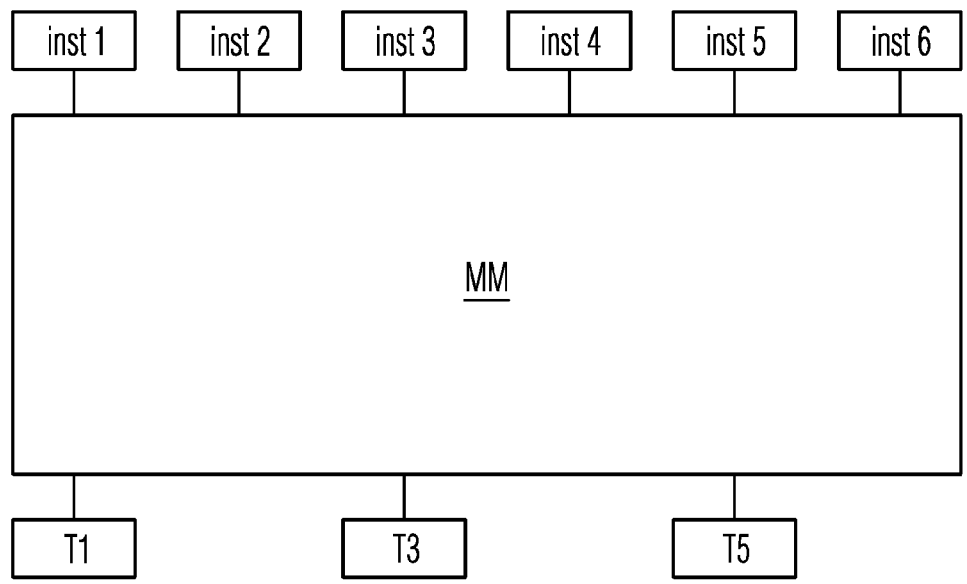
Fig. 6
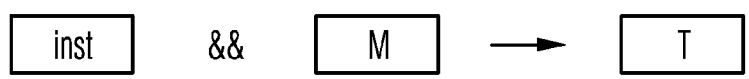
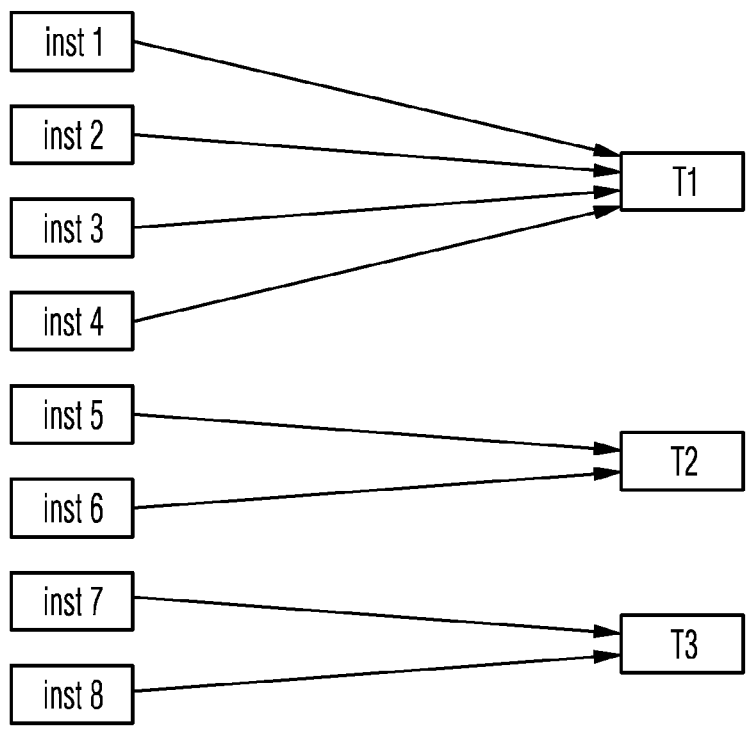

CACHE INJECTION DIRECTING TECHNIQUE

RELATED APPLICATIONS

This application claims priority to EP Patent Application No. EP08105023.9 filed on Aug. 12, 2008 and entitled METHODS AND ARRANGEMENT FOR DIRECTING CACHE INJECTION.

BACKGROUND

Cache injection is a promising technique for improving performance of input/output ("IO") data transfers in the form of direct memory access ("DMA")-write transfers. DMA-write transfers from an IO controller to memory, for example, may be used to bring IO data into a processor system. Cache injection may enable the IO controller (and potentially also other processing units or data-copy engines of the processor system) to explicitly specify the cache-/memory-location to which data should be written.

Advantageously, cache injection may reduce IO memory bandwidth requirements and improve IO performance, particularly for user-level interfaces. In this regard, the injected data may be used in the future, such as when a process is polling for such information or is put to sleep while waiting for such information. Software may provide an indication for such scenarios. Further, there are some indications that may be used by hardware, such as transfer sizes of different transfers, to indicate that cache injection is appropriate.

Multi-core processors generally include a significant number of caches, rendering cache injection techniques particularly useful. Particularly, multi-core systems are commonly used to consolidate several smaller servers using a supplemental layer for virtualization.

SUMMARY

Embodiments of the invention have been developed to direct cache injection based on actual system load.

According to some embodiments of the invention, a method for directing cache injection may include providing a snooping-based fabric having two or more bus-coupled units. At least one of the bus-coupled units may function as an injection unit for directing cache injection. A snoop request may be transmitted from the injection unit to one or more destination units of the other bus-coupled unit. The snoop request may include an identification value having a function identifier. The function identifier may identify a destination function for the cache injection, where the destination function is configured to run on the destination unit.

A snoop response may be transmitted from the destination unit to the injection unit in response to the snoop request. The snoop response may include a function response value indicating whether the function identifier matches a function indication of a snoop register for the destination unit.

A corresponding apparatus and computer program product are also disclosed and claimed herein.

BRIEF DESCRIPTION OF THE DRAWINGS

In order that the advantages of the disclosure will be readily understood, a more particular description of embodiments of the invention briefly described above will be rendered by reference to specific embodiments illustrated in the appended drawings. Understanding that these drawings depict only typical embodiments of the invention and are not therefore to be considered limiting of its scope, embodiments of the invention will be described and explained with additional specificity and detail through use of the accompanying drawings, in which:

FIG. 5 shows an embodiment of a matching mechanism for determining whether an instance identifier maps to an instance indication of the snoop register;

FIG. 6 shows an embodiment of a masking step for determining whether an instance identifier maps to a thread identifier;

DETAILED DESCRIPTION OF THE INVENTION

Figure 1:
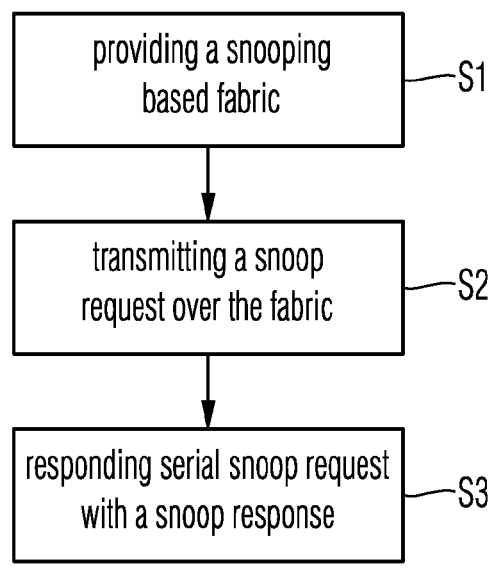
FIG. 1 shows a sequence of method steps for directing cache injection in accordance with embodiments of the present invention.

It will be readily understood that the components of the embodiments of the invention, as generally described and illustrated in the Figures herein, could be arranged and designed in a wide variety of different configurations. Thus, the following more detailed description of the embodiments of the invention, as represented in the Figures, is not intended to limit the scope of the claims, but is merely representative of certain examples of presently contemplated embodiments in accordance with the invention. The presently described embodiments will be best understood by reference to the drawings, wherein like parts are designated by like numerals throughout.

As will be appreciated by one skilled in the art, embodiments of the invention may be embodied as an apparatus, method, or computer program product. Furthermore, the present invention may take the form of an entirely hardware embodiment, an entirely software embodiment (including firmware, resident software, micro-code, etc.) or an embodiment combining software and hardware elements. Hardware and/or software elements provided to perform various tasks may be generally referred to herein as "modules." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CDROM"), an optical storage device, transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

As used herein, the term "logical partition" or "LPAR" refers to a logical segmentation of a mainframe's memory and other resources that allows it to run its own copy of the operating system and associated applications. LPARs may be implemented by special hardware circuits and may allow multiple systems images to run in one machine. This may be multiple instances of the same operating system or different operating systems. For persons skilled in the art, this is also known as a "virtualized processor complex." In a virtual computer system, physical resources such as a CPU, main memory and an IO device may be logically partitioned and allocated to each virtual computer LPAR realized on the virtual computer system.

Generally, embodiments of the present invention may determine the destination or destination unit for data injections based on a query used for determining the actual load of the system. The load may include for example, the logical partitions ("LPAR") or virtual machines running at the moment, as well as actual processes. In this regard, the snoop requests may be used to gather thread information from all bus-coupled units in the system or arrangement.

In certain embodiments, a snoop transaction may begin by sending a snoop request, such as a read request or a write request, from a requesting unit, and may end by receiving snoop responses from each potential destination unit, or a combined response of from the potential destination units. Specifically, a snoop transaction may include sending the initiating snoop request to all potential destination units, particularly to all bus-coupled units local to the same nodal coherence domain, and/or to all units coupled to the fabric. The potential destination units may be configured to snoop the request and to generate an individual response. All responses may be sent back to the requesting unit and, in some embodiments, may be combined into one response according to definite, predefined logical rules. Based on the received responses, the requesting unit may identify an appropriate destination unit. The destination, in the case of a read request, may be the source of data to be transferred. For example, in the case of a store request, the destination may be the sink of data to be transferred.

As described in more detail below, a snoop transaction may include a snoop request having a request identifier including a request type, control data and an address field indicating an address for the snoop request and corresponding snoop responses. Such a snoop transaction may maintain coherency in a snooping-based processor fabric.

Particularly, the requester of such a snoop transaction may send the snoop request to all possible destinations in the system. The possible destinations or destination units may snoop the request and create the response or snoop response. The possible destination units may determine, if they have the cache line of the address indicated by the address field in their cache, whether the requester may proceed with its request. The snoop responses may then be routed back to the requester, or to a centralized arbiter configured to determine the final response of the request.

Snoop requests may maintain coherence in the processor fabric both for data and address translations. Embodiments of the present invention introduce a new snoop request type. This new snoop request may contain an identification value having a function identifier that identifies a destination function for the cache injection, where the function is configured to run on at least one of the destination units. The identification value may be a process-specific identification value that may be used to detect where a process or function is running in the system. Therefore, each hardware thread in a processing unit coupled to the fabric may initialize a local register, a so-called "snoop register," for a process currently running. This register may be used to identify the process.

Figure 14:
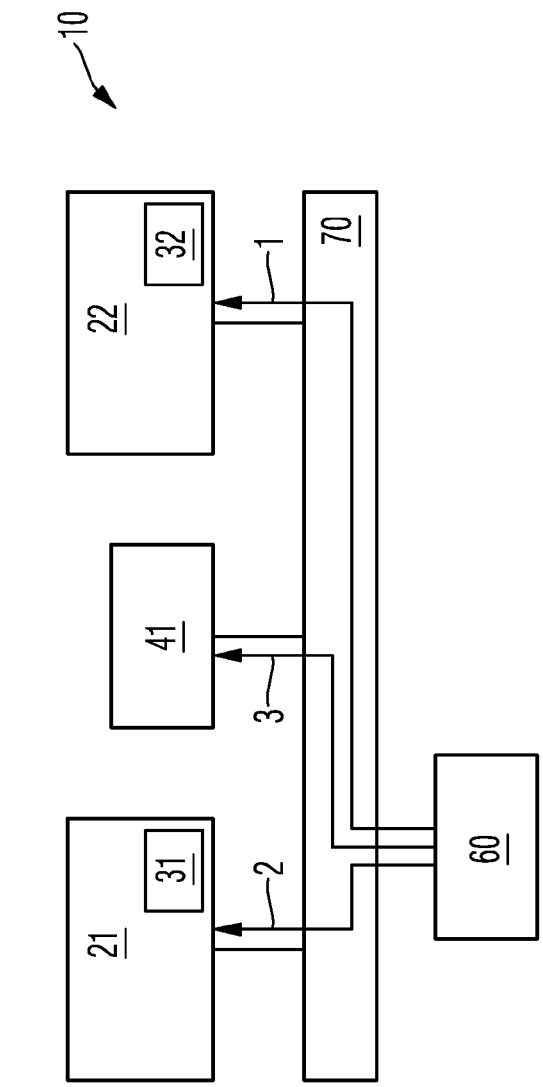
FIG. 14 shows a conventional system for cache injection.

FIG. 14 illustrates three conventional schemes for cache injection.

A first scheme 1 for cache injection may be based on a simple update. The update-based scheme may adopt a mechanism similar to that used in an update-based cache coherent fabric for DMA-write transfers. For example, if a cache line of a DMA-write transfer is present in a system cache, the cache line may updated with the new data rather than invalidated. This mechanism may be particularly useful for user-level interfaces since the user may enter the data into a local cache.

As used herein, the term "cache-line" is used to refer to the size of one data transfer in the fabric, rather than the size of a cache-line in a cache, since this might vary from cache to cache. In this regard, a fabric or snooping-based cache-coherent fabric connecting processors or processing units may be based on cache-line transfers with support for partial transfers, e.g. for non-cacheable transfers. Further, caches in the system may be organized to have a coarser granularity in their cache directory, e.g. comprising four fabric transfer units or four fabric transfers in one block.

A second scheme 2 for cache injection may include IRQ-directed cache injection. IRQ-directed cache injection may be useful for applications where the processing unit receiving an interrupt is also the processing unit that will work on the data, for example in centralized TCP/IP-processing stacks. That is, one or more processing units in the system may be dedicated to processing incoming TCP/IP-packets.

Finally, a third scheme 3 for cache injection may include static cache injection. This scheme 3 may be suitable if an IO device is served by a single process, like most TCP/IP-applications.

Figure 4:
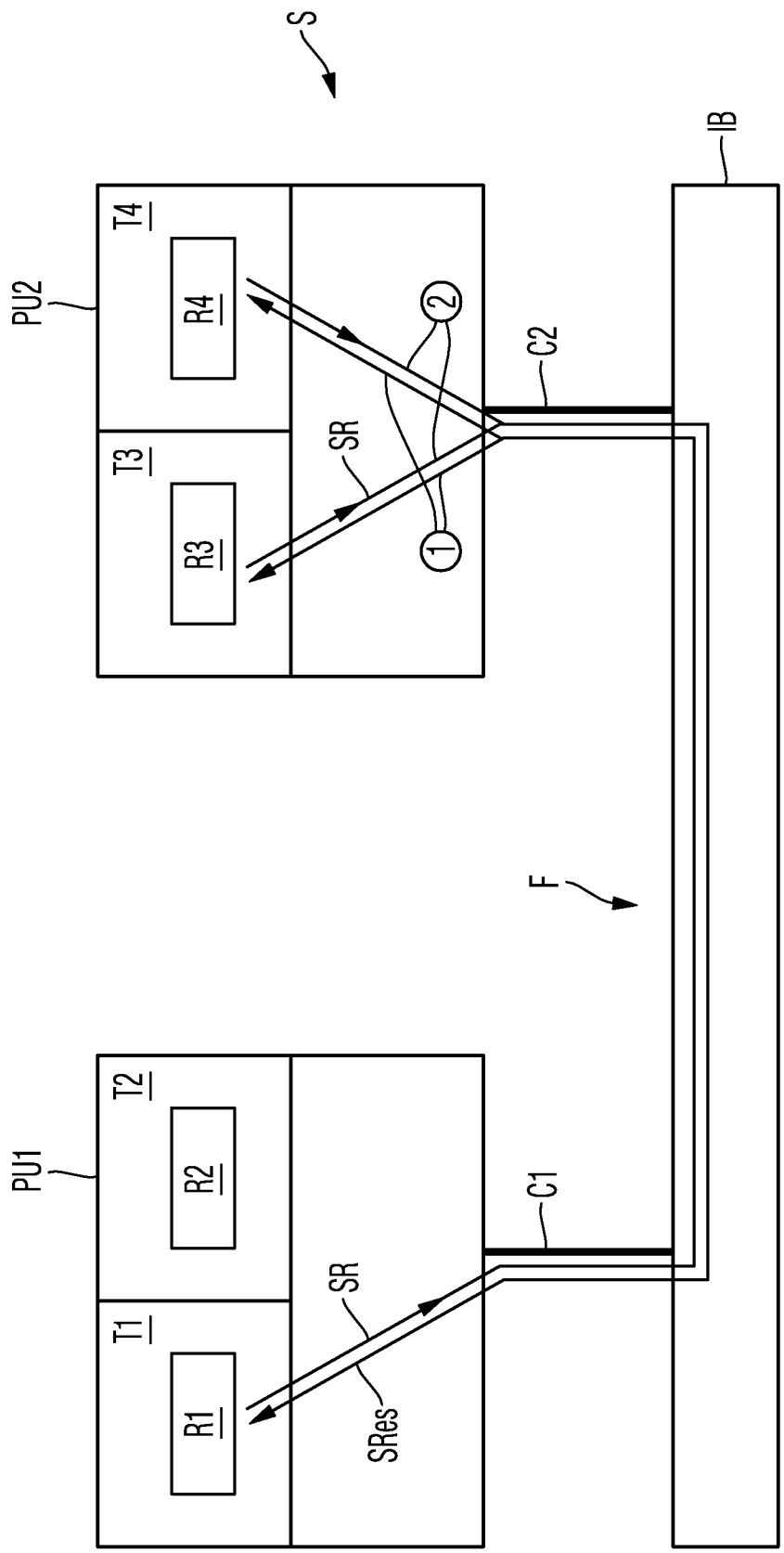
FIG. 4 shows an embodiment of an apparatus for directing cache injection.

Referring now to FIG. 1, a method is presented for directing cache injection based on actual system load in accordance with embodiments of the present invention. FIG. 4 illustrates a corresponding apparatus for directing cache injection in accordance with embodiments of the invention.

Particularly, in some embodiments, a snooping-based fabric F may be provided SI. The snooping-based fabric F may have two or more bus-coupled units PU1, PU2, where at least one of the bus-coupled units PU1 functions as an injection unit for directing cache injection.

The bus-coupled units PU1, PU2 may be coupled by an interconnect bus IB, and may include at least one processing unit PU1, PU2 and at least one IO-controller IOC to couple at least one IO-device IOD. The injection unit PU1 may be one of the processing units PU1 or one of the IO controllers IOC. The destination unit PU2 may be another processing unit PU2 or one of the IO controllers IOC.

The bus-coupled units may include a processing unit PU1, PU2, an IO controller IOC, and a cache directory. The injection unit may be one of the processing units PU1, PU2 or one of the IO controllers IOC. In some embodiments, the destination unit may be one of the processing units PU1, PU2, one of the IO-controllers IOC, or one of the cache directories CD (see FIG. 12).

A snoop request SR may be transmitted from the injection unit PU1 to a destination unit PU2 of the other bus-coupled units. The snoop request SR may include an identification value IV and a function identifier, for example. The function identifier may identify a destination function for the cache injection adapted to run on one or more of the destination units PU2.

One advantage of using a snooping mechanism for injection in accordance with embodiments of the present invention may include providing sufficient interaction with the snooping-based or other fabric such that injects for both IO- and PU-initiated cache injections may be determined. In this regard, the injection unit may be an IO controller or a processing unit. Embodiments of the invention also provide information about actual load running on the system or fabric. This facilitates determining the hierarchy level and destination for injects based on system load. One skilled in the art will recognize that embodiments of the present invention may apply to both snooping-based cache-coherent processor fabrics as well as to directory-based systems.

Figure 2A:
FIG. 2a depicts an embodiment of an identification value.

Referring now to FIG. 2a, the identification value IV may include a logical partition ("LPAR") identifier that identifies a definite logical partition in the system as a destination LPAR for the cache injection. The identification value IV may further include a function identifier ("FUNC") identifying a destination function or process for the cache injection adapted to run on one or more of the destination units. Finally, the identification value IV may include an instance identifier INST identifying a destination instance of the destination function indicated by the function identifier.

In certain embodiments, such as in large multi-core processing systems with hardware-virtualization support for example, the identification value IV may be configured according to above-mentioned architecture. Specifically, the identification value IV may include a field indicating the LPAR or virtual environment currently running on the processors or processing units, a field indicating the function, and a field indicating the instance of a function. With this information, it may be possible to make a good decision about where and whether to inject data. On one hand, it may not be very efficient to inject data for a process which is not running, and whose LPAR is currently not running in the system. On the other hand, if the LPAR is running but the function is not, it might be better to inject into a victim cache coupled to the fabric or part of the fabric rather than the cache of a processor. Finally, the instance field may provide a possibility to enable load-spreading for injection.

In some embodiments, the following indications may be stored in the respective snoop register R3, R4 of the corresponding destination unit PU2. First, an LPAR indication may indicate the actual logical partition in the system of the corresponding bus-coupled unit. A function indication may indicate the actual function or process of the corresponding actual LPAR, or the actual function running or able to run on the actual LPAR. An instance indication may indicate the actual instance of the actual function, or the actual instance running or able to run on the actual LPAR.

A possible extension of this embodiment may be to provide a directory in the corresponding processing units containing the identifiers for threads or thread identifiers scheduled on the processing unit, but currently not running. Therefore, the preciseness of injects or data injects or cache injects may be increased, because the location of destination threads may be determined even when they are not running in the fabric or system. In this regard, a snoop response may include the status of the threads, e.g. whether they are idle, sleeping or active. Another possibility may be to include such a directory in the IO controller. This may offer the possibility for the IO controller to participate in the snoop process. This may especially be appropriate for situations which use hardware acceleration as well as software processing. Depending on the actual load in the fabric, the work can thus be distributed among the hardware acceleration resource as well as software-threads.

In certain embodiments, definite snoop registers R1-R4 may be provided in the corresponding bus-coupled units PU1, PU2, respectively. For example, with respect to FIG. 4, one processing unit PU1 may have snoop-registers R1, R2, while the second processing unit PU2 may have snoop registers R3, R4. In one embodiment, the first snoop register R1 may be provided for a hardware thread T1 of a processing unit PU1. As an alternative or additional solution, a control directory may be provided in the system. The control directory may include all snoop registers R1-R4 corresponding to bus-coupled units PU1, PU2 of the system or apparatus.

Figure 2B:
FIG. 2b depicts an embodiment of a snoop request for directing cache injection.
Figure 3:
FIG. 3 depicts a second embodiment of a snoop request for directing cache injection.

Referring now to FIG. 2b, the snoop request SR may include a request identifier REQ identifying a request type. The snoop request SR may also include control data CONT, and the identification value IV. Further, as shown in FIG. 3, the snoop request SR may include the request identifier REQ, control data CONT, the identification value IV, and an address field ADR indicating an address for the snoop request SR.

Referring again to FIG. 1, the respective destination unit PU2 or units of the fabric F may respond S3 to the snoop request SR with a snoop response SRes. The snoop response SRes may be transmitted to the injection unit PU1 and may have a function response value indicating whether the function identifier matches a function indication of a snoop register R3, R4 for the destination unit P2.

For example, the snoop response SRes may include an LPAR response value indicating whether the LPAR identifier matches the LPAR indication in the corresponding snoop register, a function response value indicating whether the function identifier matches the function indication in the corresponding snoop register, and an instance response value indicating whether the instance identifier matches the instance indication in the corresponding snoop register.

In certain embodiments, the LPAR response value may be manipulated depending on whether the LPAR identifier matches the LPAR indication. In other embodiments, the function response value may be manipulated depending on whether the function identifier matches the function indication. Likewise, the instance response value may be manipulated depending on whether the instance identifier matches the instance indication.

In some embodiments, the instance identifier may be checked to determine whether it maps to at least one thread identifier of the corresponding actual LPAR. For example, one or more masks may be implemented to make this determination.

This masking step may include determining whether the instance identifier maps to at least one thread identifier of a corresponding actual hardware thread. Particularly, a number of masks smaller than or equal to the number of instances of functions running or able to run on the corresponding hardware thread may be used to make this determination. In certain embodiments, the thread identifier or identifiers that map to a respective instance identifier may be modified depending on the actual load of the corresponding actual hardware thread.

FIG. 5 shows an embodiment of a matching mechanism MM for checking whether an instance identifier inst1-inst6 maps to a thread identifier T1-T3 of the present invention. Instance identifiers inst1-inst6 for a function may be initialized with the requestor or injection unit PU1 when the injection unit PU1 registers with the destination unit PU2 for the first time. In the meantime, the number of available destination threads T1-T3 for the destination function may change due to different load situations in the system S. This may result in changes to their mapping.

The hardware, therefore, may unambiguously map the instance identifiers inst1-inst6 used by the injection unit PU1 to the available functions at any time. In this manner, the injection units may not need to change their instance fields, for example, the instance identifiers inst1-inst6, to avoid unnecessary synchronization overhead between the requestor and destination functions. This mapping may be done by masking (as shown in FIG. 6), by comparisons of lower bounds and upper bounds (as shown in FIG. 7) and by means of comparisons with a number of comparison registers R1-R8 (as shown in FIG. 8).

Particularly, FIG. 6 shows an embodiment of a masking step to determine whether an instance identifier INST, inst1-inst8, maps to a thread identifier T, T1-T3. This embodiment facilitates mapping an incoming instance identifier to a hardware thread T1-T3 of the destination unit. The mask instance value, such as the instance identifier inst1-inst8, may then be compared with the instance value configured in the snoop register R1-R4, such as the instance indication or thread identifier T1-T3. The masks in the available functions may be chosen such that all requested instances may be matched with exactly one destination function. In certain embodiments, this mechanism may limit use of a destination function to a number of requestor instances of powers of two.

Figure 7:
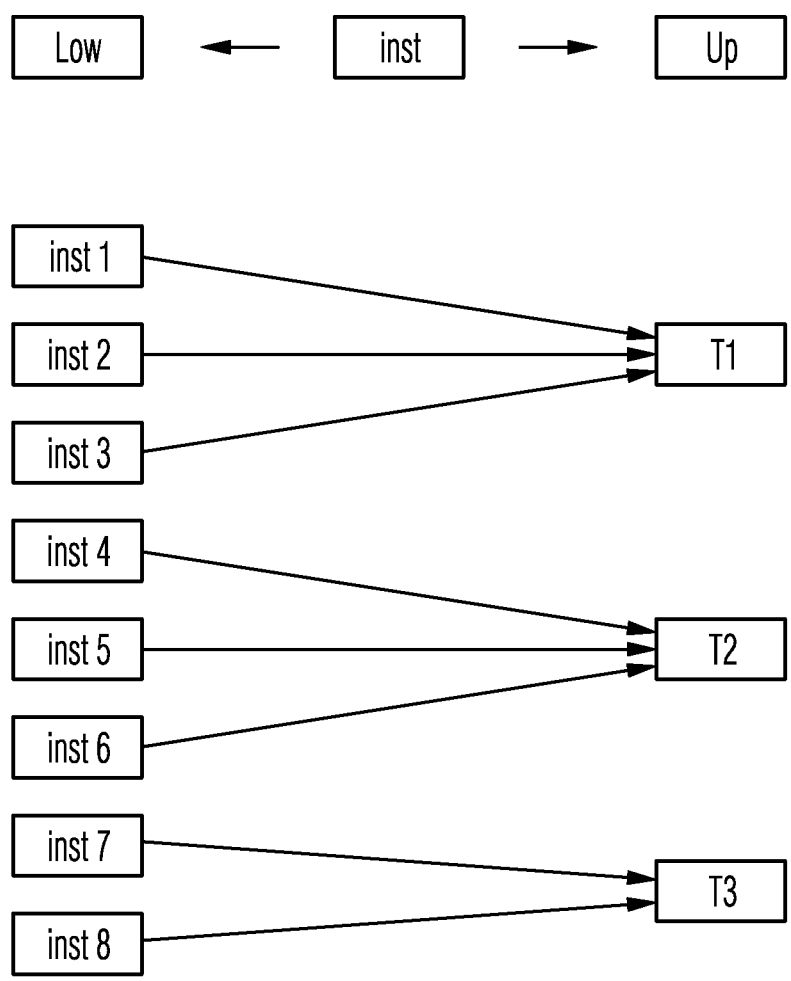
FIG. 7 shows a comparing step for determining whether an instance identifier maps to a thread identifier in accordance with embodiments of the present invention.
Figure 8:
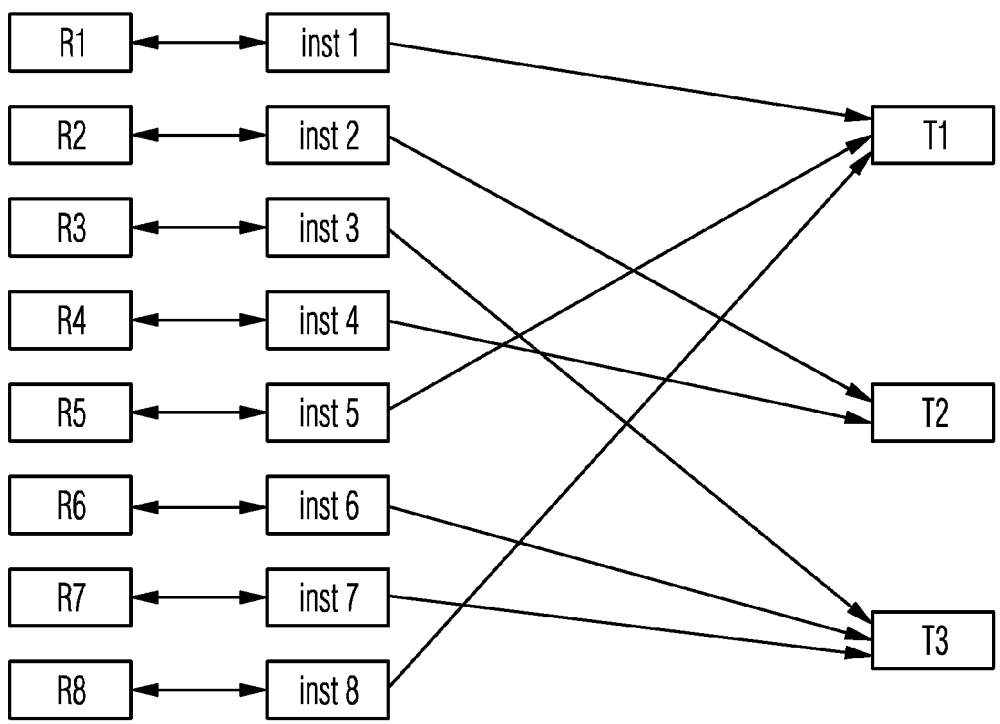
FIG. 8 shows an alternative embodiment of a comparing step for determining whether an instance identifier maps to a thread identifier in accordance with embodiments of the present invention.

FIG. 7 illustrates an exemplary embodiment of a comparing step for determining whether an instance identifier INST, inst1-inst8, maps to a thread identifier T1-T3. Specifically, the embodiment of FIG. 7 depicts a comparing step for determining whether the instance identifier INST, inst1-inst8, maps to at least one thread identifier T1-T3 of the corresponding actual hardware threads. This determination may be made by means of at least one upper UP and at least one lower LOW bound compare.

As a result of using comparators for instance matching, the embodiment of FIG. 7 may provide increased flexibility with respect to the embodiment of FIG. 6. Particularly, one or more ranges of instance identifiers having one destination function may be configured for a single serving thread T1-T3. For example, as shown, a first range of instances inst1-inst3 may be configured for the serving thread T1, a second range of instances inst4-inst6 may be configured for the serving thread T2, and a third range of instances inst7-inst8 may be configured for the serving thread T3.

FIG. 8 depicts an even more flexible implementation, where a register set R1-R8 may be configured with instance identifiers inst1-inst8 accepted for a destination function. Of course, the mapping in FIG. 8 is provided as just one example, and should not be construed as limiting in any way.

Other mapping schemes are also possible. For example, mapping may be based on hashing functions. The above-described embodiments of the mapping step may be complemented with a standard function or standard thread mechanism. For example, a standard thread may be arranged to provide a snoop response SRes with a positive function response value if the function identifier maps to the function indication without considering the instance identifier inst1-inst8 of the snoop request SR. In other words, the standard thread may always respond with a hit if the requested function hits its configured function without considering the instance field.

The combination logic handling the snoop responses (located in the injection unit or requestor, for example) may then merge the different snoop responses SRes such that the standard function or standard thread may be chosen as response if there is no other match in any attached destination unit. If there is a match for a request in another processing unit, it may be chosen or given higher priority for the snoop request.

Referring now to FIGS. 4 and 10-12, the apparatus S or system S for directing cache injection in accordance with embodiments of the present invention is explained in detail below.

As shown in FIGS. 4 and 10-12, the stronger lines C1-C5 show coupling elements C1-C5 of the arrangement or apparatus S. The finer arrows show corresponding data transfer or transfers over the coupling means C1-C5. For example, coupling element C1 may be adapted to couple a first processing unit PU1 with an interconnect bus IB. The processing unit PU1 may be adapted to transmit the snoop request SR over the coupling element C1 to the interconnect bus IB. Numerals shown in a circuit may indicate a chronology of the procedure in accordance with certain embodiments of the invention.

In this regard, FIG. 4 shows an embodiment of an arrangement or apparatus S for directing cache injection. The apparatus S may include a snooping-based fabric F with at least two bus-coupled units PU1, PU2. In some embodiments, the two bus-coupled units may include a first processing unit PU1 and a second processing unit PU2. At least one of the bus coupled units PU1, PU2 may be adapted to function as an injection unit for directing cache injection. In one embodiment, the first processing unit PU1 may be the injection unit.

In certain embodiments, the injection unit PU1 may be further adapted to transmit the snoop request SR to at least one destination unit PU2 of the other bus-coupled units PU2.

The snoop request SR may be transmitted over the interconnect bus IB from the first processing unit PU1 to the second processing unit PU2. This snoop request SR may include an identification value IV and a function identifier identifying a destination function for the cache injection adapted to run on at least one of the destination units PU2. The corresponding destination unit or units PU2 may be adapted to respond to the snoop request SR with a snoop response SRes. The snoop response SRes may include a function response value indicating whether the function identifier matches a function indication of a snoop register R3, R4 for the destination unit PU2. As shown in FIG. 4, the snoop registers R3, R4 may be provided in the second processing unit PU2, and may be further arranged for a first thread T3 and a second thread T4, respectively, of the second processing unit PU2.

Figure 10:
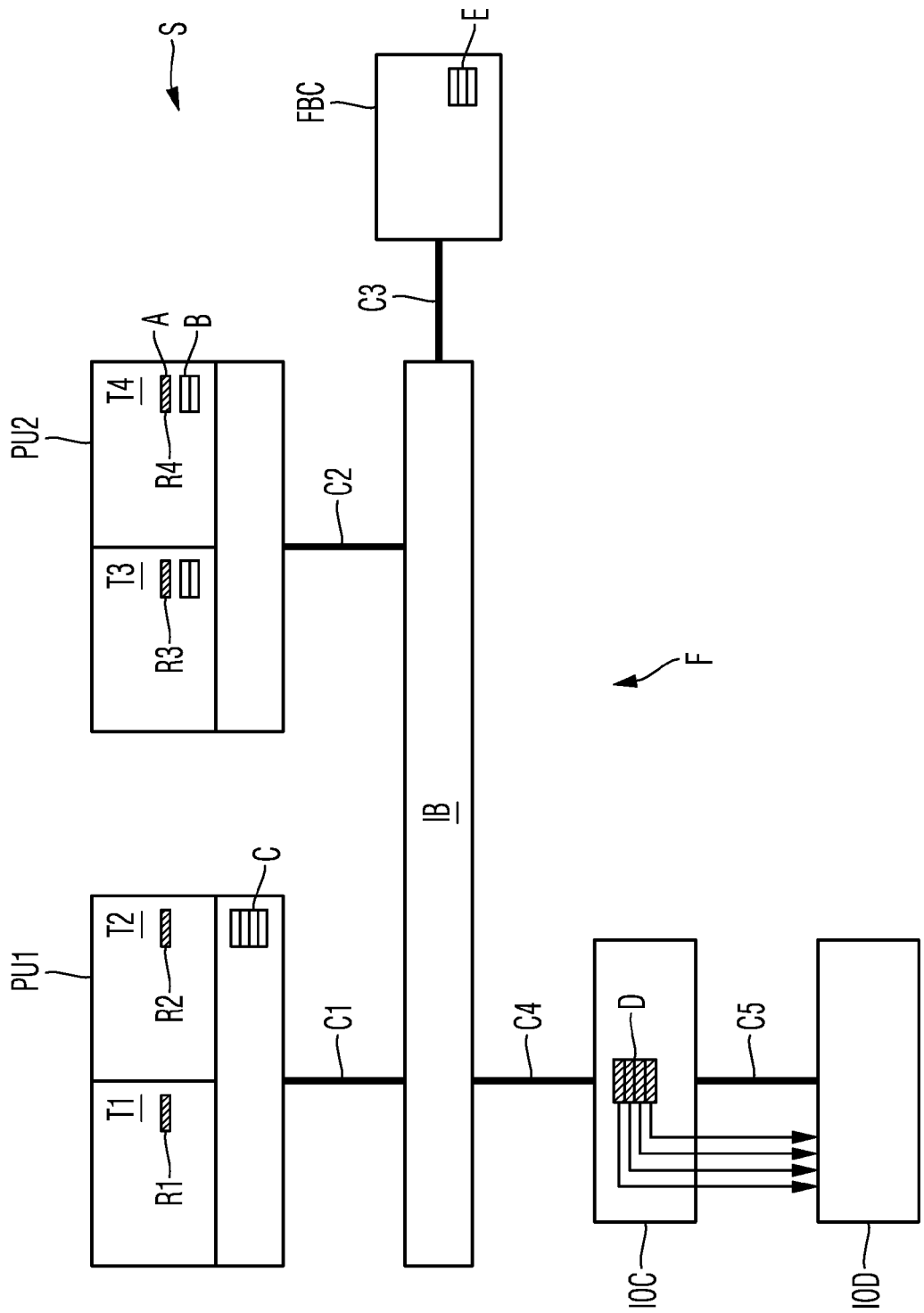
FIG. 10 shows a second embodiment of an apparatus for directing cache injection.
Figure 11:
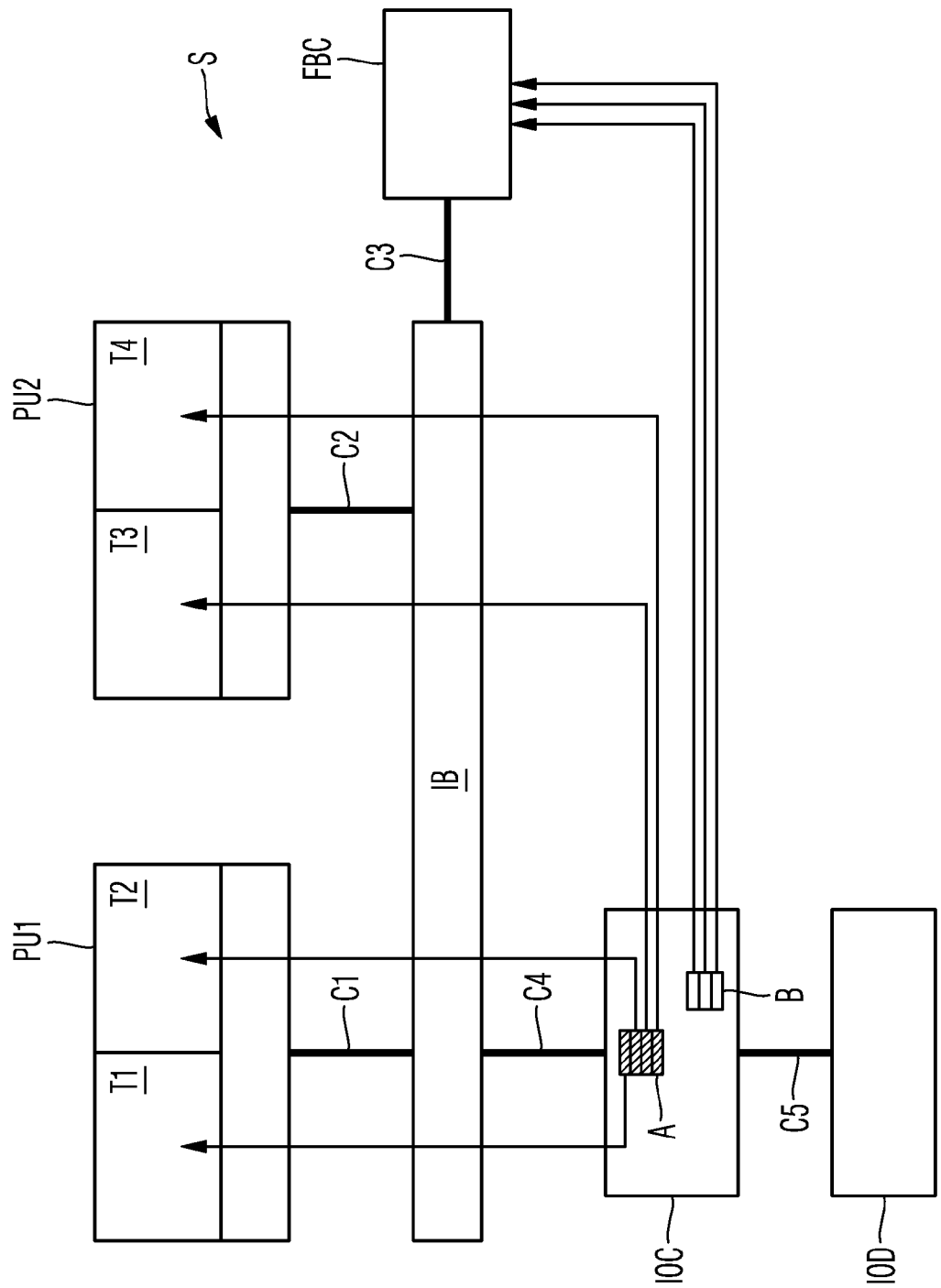
FIG. 11 shows a third embodiment of an apparatus for directing cache injection.
Figure 12:
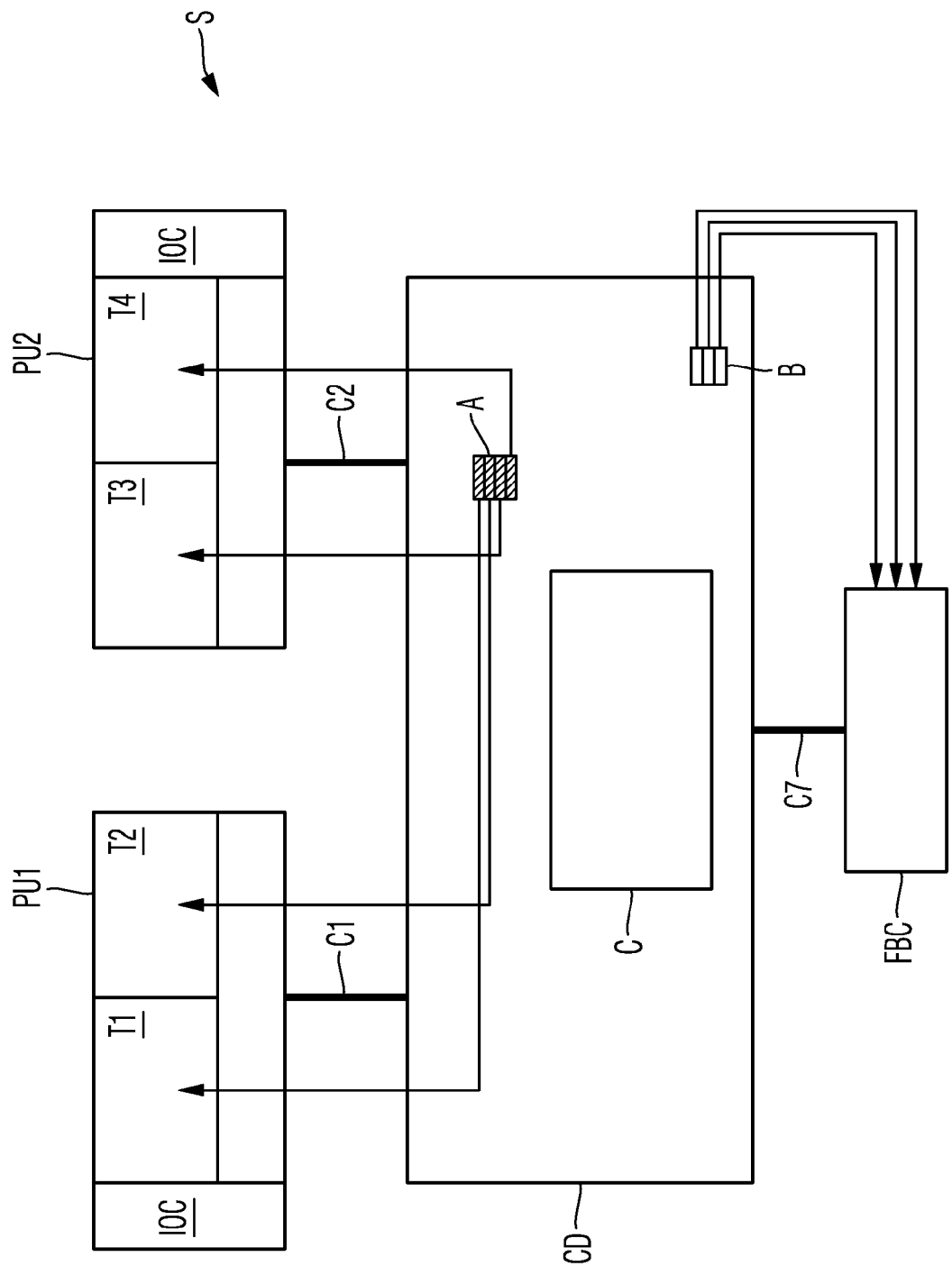
FIG. 12 shows a fourth embodiment of an apparatus for directing cache injection.

Other embodiments of an arrangement or apparatus S in accordance with the present invention are shown in FIGS. 10-12. As shown in FIG. 10, the arrangement or apparatus S may include a fabric F with two processing units PU1, PU2, a fabric bus controller FBC, an interconnect bus IB and an IO controller IOC. The IO controller IOC may be adapted to couple an IO-device IOD. In some embodiments, the arrangement or apparatus S may also include a number of registers R1-R4, A-E.

FIG. 10 shows possible locations of snoop registers R1-R4, A-E. Certain registers A may hold the snoop value of the currently active thread T1-T4 in the corresponding processing unit PU1, PU2. Other registers B, C may maintain sleeping threads scheduled on the processing unit PU1, PU2. Such registers B, C may be implemented with a certain number per hardware thread. Alternatively, one set of registers may be designated for the processing unit PU1, PU2 as a whole and, therefore, multiple threads may be implemented. Still other registers D may allow IO devices IOD attached to the IO controller IOC to participate in the snooping-based determination of a cache-injection destination.

In some embodiments, the IO device IOD or the IO-device driver may configure the snoop-register value for the IO device IOD in the IO controller IOC. Thus, a load corresponding to a function that might be implemented in a connected IO-device IOD, as well as in a software application running on one of the processing units PU1, PU2, may be balanced between available computing resources. In this context, a standard function may be configured for the IO-device IOD.

Advantageously, certain registers E may be dedicated to LPARs running in another part of the processor fabric F that need to be accessed through their fabric controller FBC. A number of snoop requests SR may thus be reduced to those corresponding to processing units PU1, PU2 local to the interconnect bus IB only, so long as no other processing unit in the system is running the requested LPAR.

In contrast, FIG. 11 shows a centralized implementation of registers A-E. One advantage of the embodiment shown in FIG. 11 may be that injection requests from IO devices IOD may not need to issue snoop requests SR for determining a destination for the injection. Instead, this process may be done directly in the IO controller IOC, thereby reducing overhead on the interconnect bus IB.

In some embodiments, snoop requests SR to other parts of the fabric F through the fabric controller FBC may be issued. For this purpose, certain registers A-D (shown in FIG. 10) may be implemented as one central set of registers A, as shown in FIG. 11. LPAR registers E (as shown in FIG. 10) may also be transferred to the centralized register set B. The arrows connected to snoop registers A indicate their function as snoop registers for the different threads in the connected processing units PU1, PU2.

This implementation may also be applied to directory-based cache-coherent systems, as shown in FIG. 12. The registers may then be located in the central cache directory CD, having a cache directory C or a cache C with a cache directory. One difference between this system and a snooping based cache-coherent system may be that instead of snoop requests SR to all connected processing units PU1, PU2 using the interconnect bus IB, each processing unit PU1, PU2 may direct a directory request DR directly to the cache directory CD. The cache directory CD may then handle the different directory requests DR. In some embodiments, such a directory request DR may be a request to detect running functions in other processing units PU1, PU2.

Figure 9:
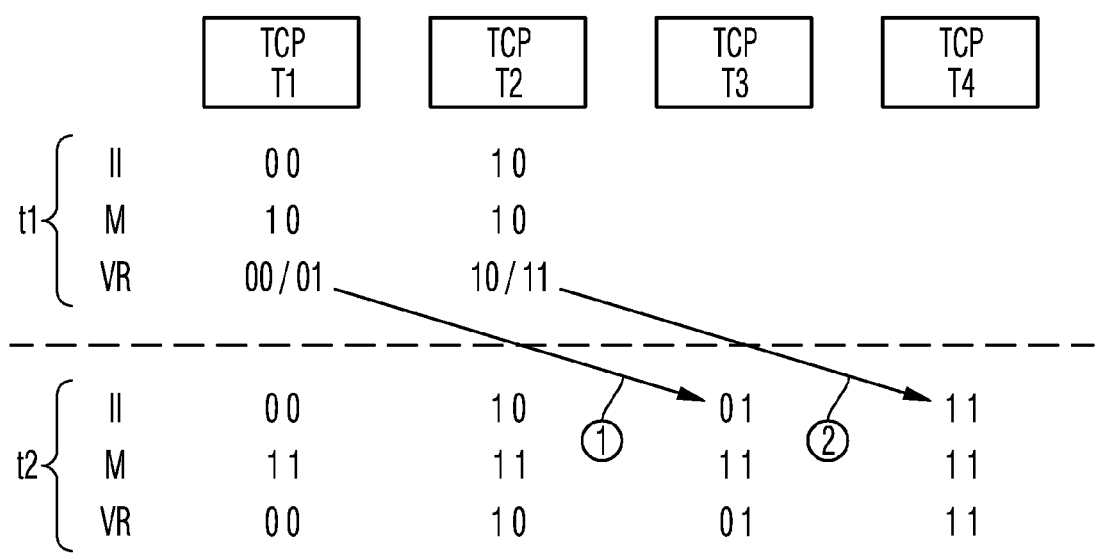
FIG. 9 shows an exemplary masking step in accordance with certain embodiments of the invention.

FIG. 9 illustrates one embodiment of a masking step, as described above with reference to FIG. 6. As shown, one processing unit PU1 may inject data into the cache of another processing unit PU2, where the processing unit PU2 is running a TCP/IP-stack. The threads T1-T4 may be different threads or instances for the same function in the same LPAR.

As shown, a snoop request with a valid instance identifier is designated by VR, M designates the respective mask, and II designates the respective instance indication stored in the respective snoop register. In one embodiment, as shown, certain threads T1 and T2 may be active and other threads T3 and T4 may be inactive at time t1. At time t2, all threads T1-T4 may be active.

The arrows 1 and 2 in FIG. 9 show one embodiment of an adaptation of the mapping of the valid requests VR to the threads T1-T4. For example, at time t1, the instances 00 and 01 may be valid for the thread T1. In contrast, at time t2, the instance 00 may valid for T1 and the instance 01 may be valid for T3.

As mentioned above, in some embodiments, different levels of matching may be created by using masks or comparators. In the example presented above, three masks or comparators may be used. One mask or comparator may identify whether the LPAR is running, one may determine whether the specified destination function is hit, and one may determine whether the instance indication matches the instance identifier of the snoop request.

In certain embodiments, the injection unit may determine the destination for the cache injection using the snoop responses of the different processing units and combining them based on match priorities. In some embodiments, load spreading may be implemented by using the instance indication and its mapping. For example, every consumer process addressing a particular serving process may utilize one defined instance identifier. Other embodiments may implement different distribution schemes for the instance identifiers, as described in more detail above.

In one embodiment, instance identifiers may be distributed substantially evenly among all requesting threads. In another embodiment, identifiers may be implemented according to the amount of work they produce. For example, in a networking environment, different instances may be used for packets of different sizes. In such a case, there may be fewer instances of a process running than instance identifiers used depending on the workload on the system or apparatus. Therefore, a compare or mask operation may be applied for comparing the instance identifier of the snoop request and the instance indication contained in the respective snoop register.

In the example shown in FIG. 9, only two TCP-threads T1 and T2 are running at time t1, but a two-bit instance identifier is used. Therefore, two instance snoop requests may be mapped to each thread using the mask which compares only the most significant bit of the instance identifier. If the load in the system increases, more TCP-threads T1-T4 may be scheduled on the system. At time t2, for example, all threads T1-T4 are active and scheduled on the system. The load may then be distributed to all of the threads T1-T4 by adjusting the mask value. Further, in some embodiments, a comparator may be used instead of a mask field if an uneven distribution among destination threads is desired.

In certain embodiments, a method in accordance with embodiments of the present invention, as described with reference to FIGS. 1-12, may be combined with another method for cache injection. Such a method may allow an IO device that receives a doorbell store request to obtain originator information indicating the originating processing unit of the doorbell store request. The IO device may also obtain a following work request, when such is posted or issued, and may use and forward this information when data for the work request is written to the processor complex or fabric. Such a method is described in European Patent Application Serial No. 08105019.7, filed on Aug. 12, 2008, and entitled "Method and an Arrangement for Cache Injection," incorporated herein by reference.

These two injection mechanisms may be combined in various ways. For example, the IO controller may be provided with all information available for an injection request from an IO device. The information may include both originator information and information on the destination function which may be configured by the IO-device driver. Priority may be given to a function hit. Therefore, if the function is found running in the system or arrangement using a snooping-based injection scheme in accordance with embodiments of the present invention, the destination unit thus derived may be used. If the function is not found while the LPAR is running, the destination provided by the IO device by means of the originator information may be used to better direct the injection if it matches the processing units running the LPAR.

Other embodiments may be used for transfers that use multiple packets. In such embodiments, the destination for the first packet of the transfer may be determined using an above-described snooping mechanism or combined injection mechanism. The result may then be passed on to the IO device, which may use the same destination, or degraded destination which is close to the final destination, for the consecutive packets of the transfer.

Figure 13:
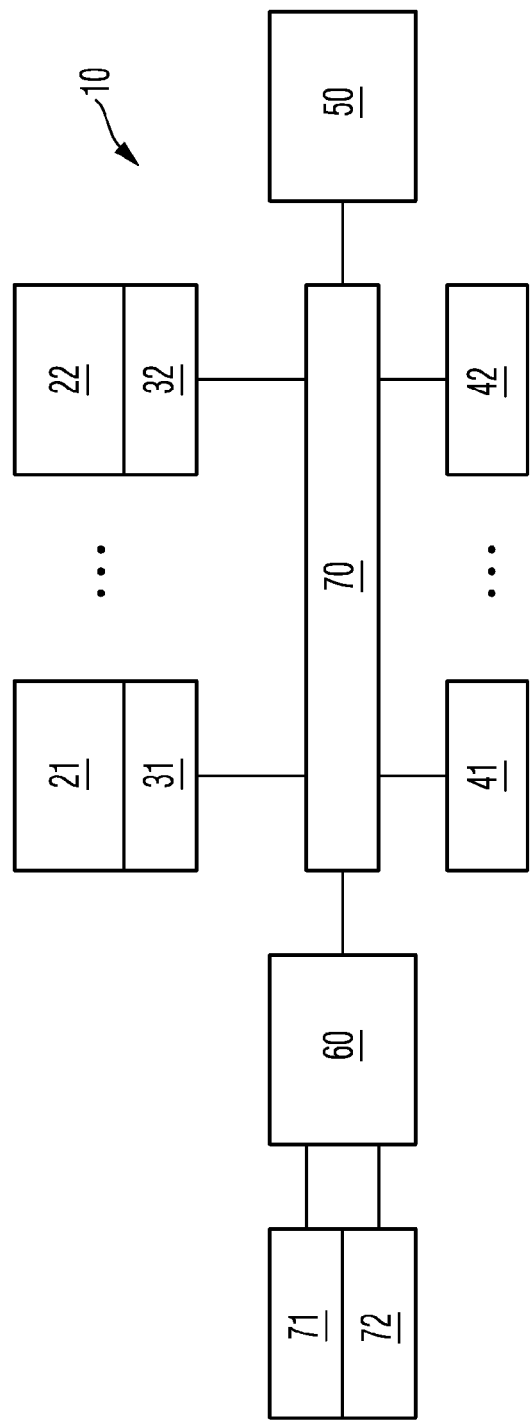
FIG. 13 shows an exemplary architecture of a processor system in accordance with certain embodiments of the present invention.

FIG. 13 shows an exemplary architecture of a multi-core processor or processor system in accordance with certain embodiments of the invention. The processor system IO of FIG. 13 may include processing units 21, 22 including processing unit caches 31, 32. The processor system IO may further include dedicated caches 41, 42, a memory controller 50 adapted to couple a memory, and an IO controller 60 adapted to couple several IO devices 71, 72.

As shown in FIG. 13, a variety of different caches may be provided in such a processor system IO. Particularly, processing unit caches 31, 32 may be provided in the form of level two caches and dedicated caches 41, 42, which may be used as victim caches on lower levels (ie., level 3 or level 4).

In some embodiments, a memory may be coupled to the processor system IO by the memory controller 50. This may be considered the lowest level, or lowest point of coherence LPC.

In some embodiments, different levels L2-LPC may be used to implement caches with different sizes and speeds. Small, fast caches may be used on higher levels that are more tightly coupled to processing units, such as the processor units attached to processing unit caches 31, 32. In contrast, bigger, slower caches may be used on the lower levels of the cache hierarchy.

The several processing units 21, 22 with their respective processing unit caches 31, 32, the dedicated caches 41, 42, the memory-controller 50 and the IO controller 60 may be coupled to each other by means of an interconnect bus 70 or processor fabric. Lower level dedicated caches 41, 42 may have their own connection to the processor interconnect 70.

Without loss of generality, FIG. 13 shows only two processing units 21, 22 and two dedicated caches 41, 42. Of course, one skilled in the art will recognize that processor systems in accordance with embodiments of the present invention may have a number of different processing units 21, 22 and dedicated caches 41, 42 to form multi-core systems.

The invention claimed is:

1. A method for directing cache injection based on actual system load, the method comprising:
providing a snooping-based fabric having at least two bus-coupled units, wherein at least one of the bus-coupled units comprises an injection unit for directing cache injection;
transmitting a snoop request from the injection unit to at least one destination unit of the other bus-coupled unit, wherein the snoop request comprises an identification value comprising (1) a local partition ("LPAR") identifier identifying a local partition in the system as a destination LPAR for the cache injection; and (2) a function identifier identifying a destination function for the cache injection, wherein the destination function is configured to run on at least one destination unit; and responding to the snoop request by transmitting a snoop response from the destination unit to the injection unit.

2. The method of claim 1, wherein the snoop response comprises a function indication that indicates an actual function of a corresponding actual local partition, and wherein the actual function is able to run on the actual local partition.

3. The method of claim 2, wherein the identification value further comprises an instance identifier identifying a destination instance of the destination function indicated by the function identifier.

4. The method of claim 3, wherein the snoop response comprises:
- an LPAR response value indicating whether the LPAR identifier matches an LPAR indication in a corresponding snoop register;
- a function response value indicating whether the function identifier matches the function indication in the corresponding snoop register; and
- an instance response value indicating whether the instance identifier matches an instance indication in the corresponding snoop register.

5. The method of claim 4, further comprising storing in a snoop register corresponding to the destination unit the LPAR indication indicating the actual local partition of the corresponding bus-coupled unit, the function indication indicating the actual function of the corresponding actual LPAR, wherein the actual function is able to run on the actual LPAR, and the instance indication indicating the actual instance of the actual function, wherein the actual instance is able to run on the actual LPAR.

6. The method of claim 5, further comprising providing a definite snoop register in the corresponding bus-coupled unit.

7. The method of claim 5, further comprising:
- manipulating the LPAR response value upon the LPAR identifier matching the LPAR indication;
- manipulating the function response value upon the function identifier matching the function indication; and
- manipulating the instance response value upon the instance identifier matching the instance indication.

8. The method of claim 5, further comprising determining whether the instance identifier maps to an instance indication of the snoop register for a corresponding actual hardware thread.

9. The method of claim 8, further comprising utilizing at least one mask to determine whether the instance identifier maps to at least one thread identifier of the corresponding actual hardware thread.

10. The method of claim 9, further comprising utilizing a number of masks to determine whether the instance identifier maps to at least one thread identifier of the corresponding actual hardware thread, wherein the number of masks is less than or equal to a number of instances of functions able to run on the corresponding actual hardware thread.

11. The method of claim 9, further comprising modifying a thread identifier that maps to the instance identifier according to a number of threads scheduled for the corresponding actual function.

12. The method of claim 8, further comprising comparing at least one of an upper bound and a lower bound to determine whether the instance identifier maps to at least one thread identifier of the corresponding actual hardware thread.

13. The method of claim 12, further comprising configuring at least one range of instance identifiers for one definite serving thread identified by a corresponding thread identifier.

14. The method of claim 8, wherein at least one matching register is used to determine whether the instance identifier maps to at least one thread identifier of the corresponding actual hardware thread, wherein a register compare is performed for every instance of the destination function.

15. The method of claim 5, further comprising merging the snoop responses of the destination units to provide a snoop result indicating a destination for the cache injection.

16. The method of claim 15, wherein a standard thread provides a snoop response with a positive function response value if the function identifier maps to the function indication without reference to the instance identifier of the snoop request.

17. The method of claim 1, wherein the snoop request comprises at least a request identifier identifying a request type, control data, and the identification value.

18. The method of claim 17, wherein the snoop request further comprises an address field indicating an address for the snoop request.

19. An apparatus for directing cache injection based on actual system load, the apparatus comprising:
- a snooping-based fabric having at least two bus-coupled units, wherein at least one of the bus-coupled units comprises an injection unit for directing cache injection;
- the injection unit configured to transmit a snoop request to at least one destination unit of the other of the bus-coupled units, wherein the snoop request comprises an identification value comprising (1) a local partition ("LPAR") identifier identifying a local partition in the system as a destination LPAR for the cache injection; and (2) a function identifier identifying a destination function for the cache injection, wherein the destination function is configured to run on at least one of the destination units; and
- the destination unit configured to respond to the snoop request by transmitting a snoop response to the injection unit.

20. A computer program product for directing cache injection based on actual system load, the computer program product comprising:
- a non-transitory computer-readable medium having computer-usable program code embodied therein, the computer-usable program code comprising:
  - computer-usable program code for providing a snooping-based fabric having at least two bus-coupled units, wherein at least one of the bus-coupled units is an injection unit for directing cache injection;
  - computer-usable program code for transmitting a snoop request from the injection unit to at least one destination unit of the other bus-coupled unit, wherein the snoop request comprises an identification value having comprising (1) a local partition ("LPAR") identifier identifying a local partition in the system as a destination LPAR for the cache injection; and (2) a function identifier identifying a destination function for the cache injection, wherein the destination function is adapted to run on at least one destination unit; and
  - computer-usable program code for responding to the snoop request by transmitting a snoop response from the destination unit to the injection unit.

* * * * *